United States Patent [19]

Kwak

[11] Patent Number: 5,061,043
[45] Date of Patent: Oct. 29, 1991

[54] COLOR LIQUID CRYSTAL DISPLAY DEVICE WITH A GREEN DYE

[75] Inventor: Jinoh Kwak, Suwon, Rep. of Korea

[73] Assignee: Samsung Electron Devices, Co., Ltd., Kyungki, Rep. of Korea

[21] Appl. No.: 445,450

[22] Filed: Dec. 4, 1989

[30] Foreign Application Priority Data

Dec. 24, 1988 [KR] Rep. of Korea .............. 88-21392[U]

[51] Int. Cl.$^5$ .............................................. G02F 1/133
[52] U.S. Cl. .................................... 359/63; 359/93; 359/96
[58] Field of Search ............... 350/347 E, 337, 339 F, 350/349

[56] References Cited

U.S. PATENT DOCUMENTS

| | | | |
|---|---|---|---|
| 4,396,251 | 8/1983 | Mukoh et al. | 350/339 F |
| 4,398,803 | 8/1983 | Pohl et al. | 350/337 |
| 4,859,037 | 8/1989 | Iwashita et al. | 350/347 E |

FOREIGN PATENT DOCUMENTS

| | | | |
|---|---|---|---|
| 0152827 | 8/1985 | European Pat. Off. | 350/339 F |
| 0103126 | 5/1986 | Japan | 350/337 |
| 0066234 | 3/1987 | Japan | 350/339 F |
| 0068813 | 3/1988 | Japan | 350/337 |
| 0209424 | 8/1989 | Japan | 350/337 |

*Primary Examiner*—Stanley D. Miller
*Assistant Examiner*—Anita Pellman Gross
*Attorney, Agent, or Firm*—Christie, Parker & Hale

[57] ABSTRACT

The liquid crystal display device in which the liquid crystal layer is composed of the liquid crystal materials with a green dye, the upper polarizer foil is formed on the top glass plate being oriented at the desired angle of about 40° to 50° with respect to the rubbing direction of the orientational layer and the lower polarizer foil is mounted on the bottom glass plate being oriented at the predetermined angle of 90° with respect to the angle of polarization of the upper polarizer foil, thereby having the slow curve of transmissivity of the filters, and thereby utilizing the full and multi color effects.

1 Claim, 1 Drawing Sheet

COLOR LIQUID CRYSTAL DISPLAY DEVICE WITH A GREEN DYE

BACKGROUND OF THE INVENTION

The present invention relates to a color liquid crystal display device (hereinafter referred as "color LCD") and more particularly to a color LCD comprising a liquid crystal layer formed of liquid crystal material added with a dye so as to obtain equal transmissivities of R(red), G(green) and B(blue) color filters respectively.

A color LCD in accordance with the prior art includes top and bottom glass plates, transparent conductive electrodes etched and formed on the glass plates respectively according to the predetermined arrangement, orientational layers on the interior surface of the conductive electrodes respectively, spacers between the opposite orientational layers to maintain a constant cell gap and liquid crystal materials injected between the orientational layers.

The injection of the liquid crystal materials may be embodied by a vacuum injecting method.

As is well-known, it has been found that the prior art color LCD is provided with a liquid crystal layer, which is made of any liquid crystal materials added with dopants of various kinds in connection with the cell gap and the liquid crystal twist angle.

In addition, the color LCD thus formed is provided with a two laminated structure of the cell utilizing a color effect.

The LCD, as manufactured by the prior art, allows to twist its liquid crystal material, and is capable of having the slow curve of transmissivity of light rays by interfering the rays due to the anisotropic characteristics of the liquid crystal material. In other words, there is a smooth or gradual change in the transmissivity of light rays rather than an abrupt change.

However, in the prior art color LCD thus formed, there are problems that a slight deviation of the cell gap brings about an extreme variation of the color, the cost of manufacturing the LCD is high due to a two laminated structure in order to utilize a color effect and the full and multi color effects of the LCD are not embodied practically by means of the above mentioned structure.

To utilize the color effects generally, the LCD should have the slow curve of characteristics in the transmissivity of light rays in connection with voltage power, although the determined quantity of any dopants is added to liquid crystal materials so as to twist excessively the materials.

SUMMARY OF THE INVENTION

Accordingly, in order to solve the above mentioned problems, the object of the present invention is to provide the color LCD utilizing the full and multi color effects, the LCD comprising a liquid crystal layer formed of the liquid crystal materials with a dye to equal the transmissivities of the R, G and B color filters respectively, so consequently the materials can be arranged in the same directions.

BRIEF DESCRIPTION OF THE INVENTION

The above object and other advantages of the present invention will become more apparent by describing in detail the preferred embodiment of the present invention with reference to the attached drawings in which.

DETAILED DESCRIPTION OF THE INVENTION

Figure 1:
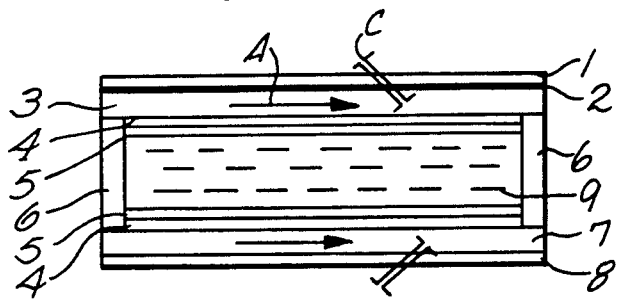
FIG. 1 is a sectional view of the color liquid crystal display device according to the invention.

Referring now to FIG. 1, there is illustrated a sectional view of the color LCD in accordance with the invention.

The color LCD comprises top and bottom glass plates 3, 7. On the outside surface of the glass plate 3 is deposited a color filter 2 made of R, G, and B color, on the interior surface of the plate 3 is coated a transparent conductive electrode 4 by etching as the predetermined arrangement and upon the interior surface of the electrode 4 is formed and rubbed an orientational layer 5.

Subsequently, a upper polarizer foil 1 is mounted on the color filter, being oriented at a predetermined angle and preferredly 40° to 50° with respect to the rubbing direction A as indicated by the arrow direction of FIG. 1.

In the meantime, on the interior surface of a bottom glass plate 7 is coated a transparent conductive electrode 4', on the conductive electrode 4' is formed an orientational layer 5' by the above described manner. The substrates 3, 7 on the plates are deposited in several layers as noted above, are opposite each other and are maintained in the predetermined cell gap by means of spacers 6.

Between the substrates thus formed is provided a liquid crystalline or liquid crystal layer 9 which is made of liquid crystal materials with R, G, and B dyes, and on the outside surface of the glass plate 7 is mounted a lower polarizer foil 8 being oriented at the angle (as indicated by B of FIG. 1) perpendicular to the angle of polarization of the upper polarizer foil 1.

The operation of the color LCD as manufactured by this manner will be explained in detail with reference to FIGS. 2 and 3.

Figure 2:
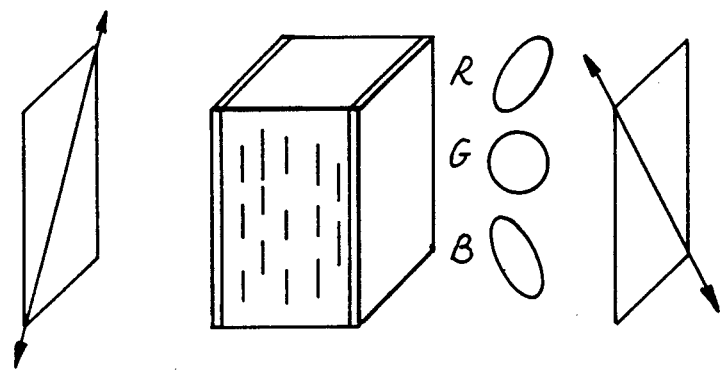
FIG. 2 is a simplified schematic diagram modeling the operation of the color LCD of FIG. 1 in the case that a voltage power is not applied to the LCD.
Figure 3:
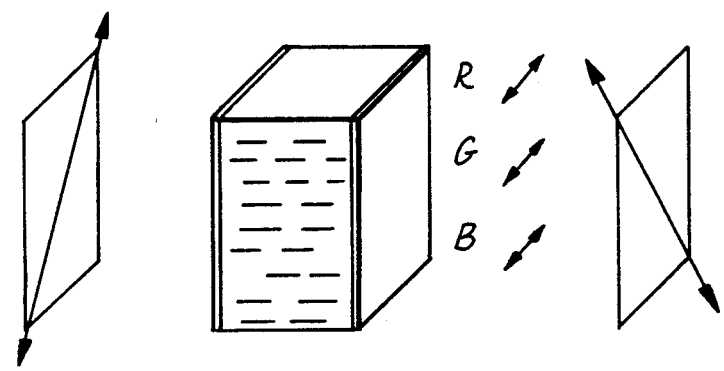
FIG. 3 is a simplified schematic diagram modeling the operation of the color LCD of FIG. 1 in the case that a voltage power is applied to the LCD.

Referring to FIG. 2, there is shown a simplified schematic diagram modeling the operation of the color LCD of FIG. 1 in the case that a voltage power is not applied to the electrodes of the LCD.

The color LCD is provided that the cell gap of the upper and lower substrates is controlled by the thickness of the spacer 6 in order that ¼ wave-length of the green dye for the green (G) filter is equal to the multiplication of the refractive index anisotropy ($\Delta n$) of the liquid crystal material to be introduced in the cell and the cell gap (d) between the substrates.

The cell gap between the substrates is equal to the ¼ wave plate of the LCD with the consequence that the light beam passed through the polarizer foil 1 is transmitted through the liquid crystal layer 9 and the circularly polarized light passed through the green dyes in the liquid crystal layer 9 is passed through the lower polarizer foil 8.

In addition, when the liquid crystal material has been added with dyes, the light rays passed through the green filter get to be the circularly polarized light but the light rays through the red and blue filters get not to be the circularly polarized light, so that the green light of the light rays passed through the lower polarizer foil 8 can be obtained in luminance more than the red and blue light.

Therefore, to obtain the equal transmissivity in the R, G, and B filters, the dye absorbing the green light should be used in the present. FIG. 3 is illustrated a simplified schematic diagram of the operation of the color LCD in the case that a voltage power is not applied to the electrodes of the LCD.

While a voltage power is applied to the LCD, the liquid crystal of the layer 9 is arranged in a parallel direction with respect to the electric field direction, and consequently the light is not converted into the circularly polarized light.

As the light passed through the upper polarizer foil 1 is passed through the liquid crystal layer 9, the variation of the polarized directions of the light does not occur in the liquid crystal layer 9 while a driving voltage is applied to the LCD, and then the light is intercepted by the lower polarizer foil 8.

Accordingly, as explained above, it has been found that the color LCD according to the invention can obtain the utilization of the color effect without manufacturing a two laminated structure of the LCD, thereby saving the process cost.

It has been also found that the LCD is provided with the liquid crystal layer made of the liquid crystal material with green dyes, thereby having the same transmissivity of the R, G, and B filters.

Further, it was discovered that the liquid crystal of the LCD is not twisted with the consequence that the LCD can obtain the slow curve transmissivity with respect to a voltage power to be applied to it, and the LCD can be obtained utilizing the full and multi color effects.

What is claimed is:

1. A liquid crystal display device comprising top and bottom glass plates, transparent conductive electrodes coated respectively between the glass plates, orientational layers formed respectively between the conductive electrodes, spacers formed respectively between the glass plates to maintain a predetermined cell gap, a liquid crystal layer composed of liquid crystal materials with dyes of R (red), G (green) and B (blue) colors in the space between the plates, and polarizer foils mounted respectively on the external surface of the glass plates, in which the liquid crystal layer is injected with green dye in order to decrease the transmissivity of the green light in the off state, the cell gap between the glass plates is controlled by the spacers in order that a quarter of the wave-length of the green dye is equal to the multiplication of the refractive index anisotropy of the crystal material and the thickness of the crystal layer, the upper polarizer foil formed on the outside surface of the top glass plate being oriented at about 40° to 50° with respect to the rubbing direction of the orientational layer and the lower polarizer foil formed the outside surface of the bottom glass plate being oriented at 90° with respect to the angle of polarization of the upper polarizer foil.

* * * * *